United States Patent [19]

Cox et al.

[11] 4,396,825
[45] Aug. 2, 1983

[54] AIR-COOLED TOASTER WITH DEFLECTOR

[75] Inventors: Charles E. Cox, Lower Providence Township, Montgomery County; Roger V. Eeckhout, Warminster, both of Pa.

[73] Assignee: SCM Corporation, New York, N.Y.

[21] Appl. No.: 261,309

[22] Filed: May 7, 1981

[51] Int. Cl.³ .................................................. H05B 3/06
[52] U.S. Cl. ...................................... 219/521; 99/389; 99/401; 219/343; 219/531
[58] Field of Search ............... 219/343, 347, 377, 400, 219/521, 531, 535; 99/340, 385, 389, 393, 401

[56] References Cited

U.S. PATENT DOCUMENTS

| | | | |
|---|---|---|---|
| 1,624,182 | 4/1927 | Rebora | 99/401 X |
| 1,876,901 | 9/1932 | Forbes | 99/401 X |
| 2,071,234 | 2/1937 | Merrill | 99/401 X |
| 2,383,673 | 8/1945 | Olving | 219/521 X |
| 2,414,325 | 1/1947 | Newell | 219/377 |
| 2,476,142 | 7/1949 | Goddard | 219/535 |
| 2,862,441 | 12/1958 | Schmall | 99/340 |
| 2,912,922 | 11/1959 | Schmall | 99/401 X |
| 2,941,463 | 6/1960 | Di Cuia | 99/393 |

*Primary Examiner*—Volodymyr Y. Mayewsky
*Attorney, Agent, or Firm*—Armand G. Guibert; Ernest F. Weinberger

[57] ABSTRACT

Deflector at top of toasting chamber enhances flow of cooling air in a space between the outer cover of a toaster and the inner wall of a "double wall" structure by projection inward relative to the top opening in the toaster cover.

10 Claims, 10 Drawing Figures

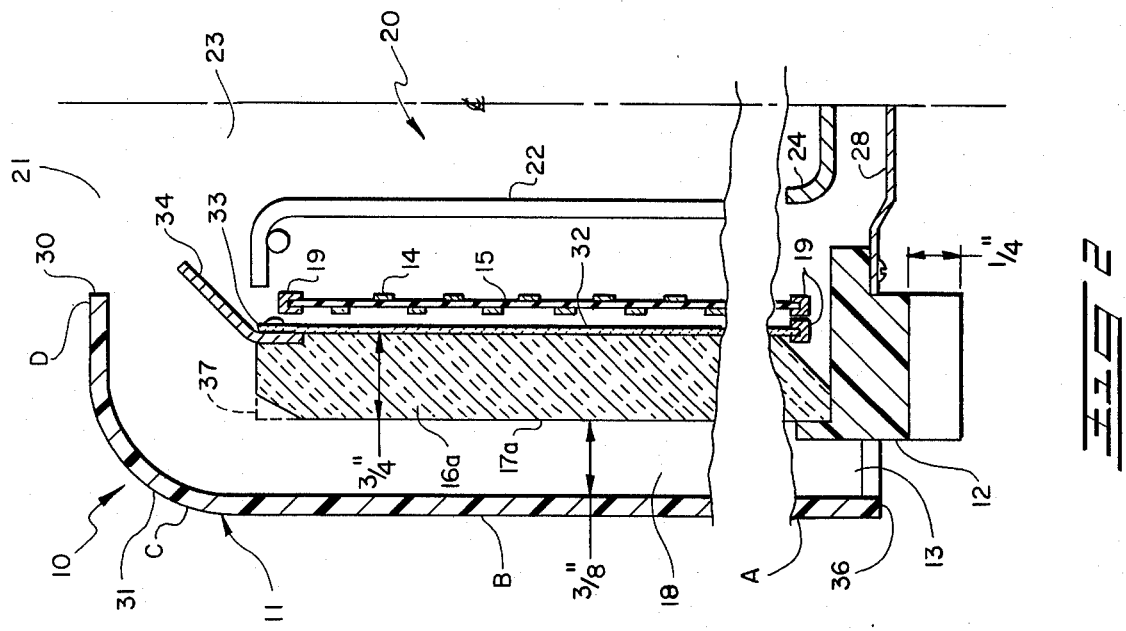
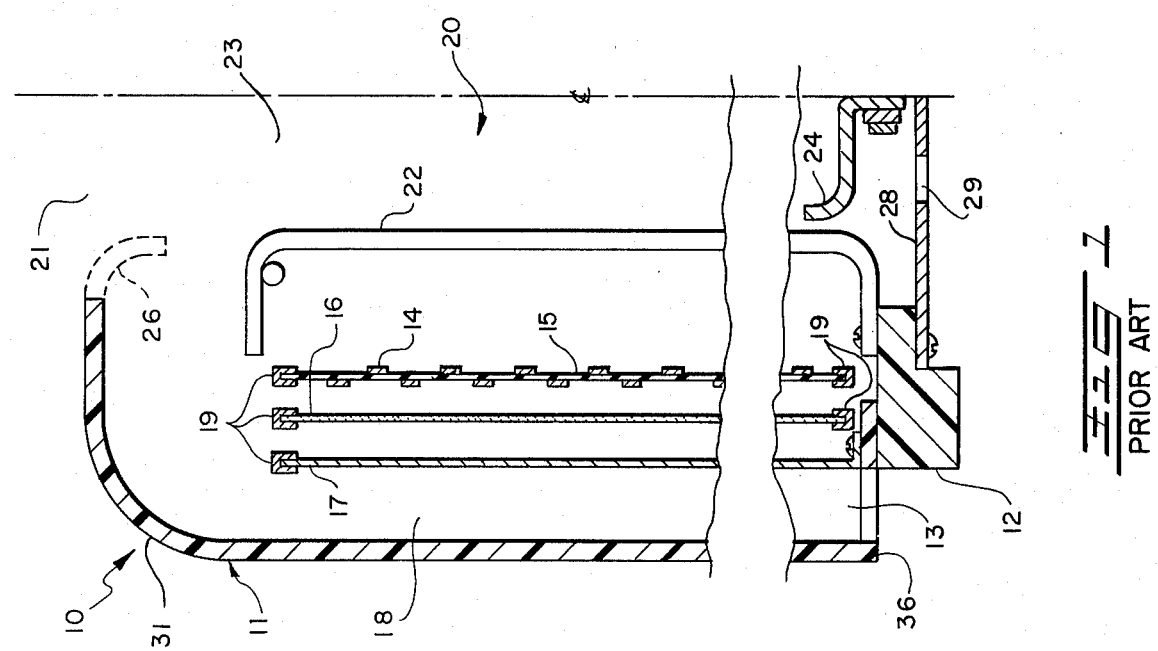

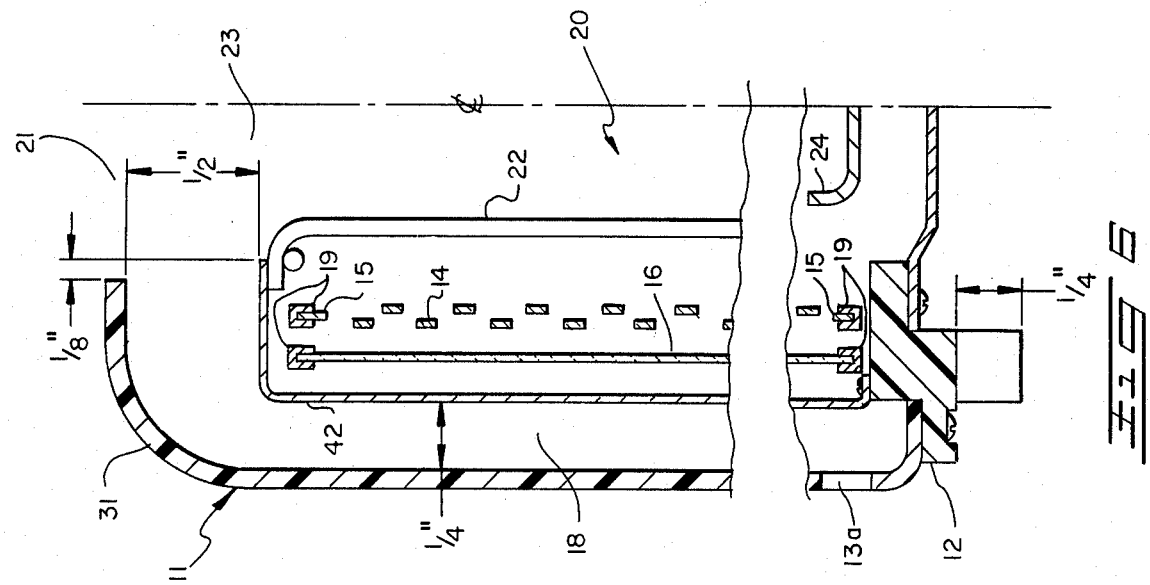
_Fig 6_
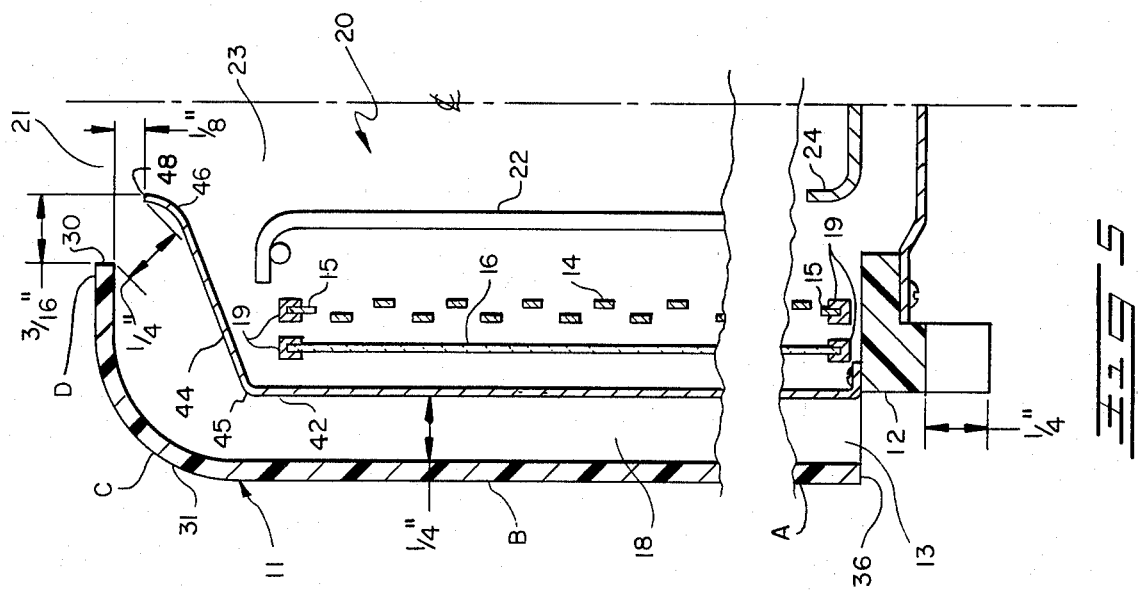
_Fig 5_

AIR-COOLED TOASTER WITH DEFLECTOR

BACKGROUND OF THE INVENTION

1. Field of the Invention

This invention relates to toasters of the type having a double wall structure permitting the outer walls to remain relatively cool during operation of the toaster. In particular, it concerns improved free convective cooling of these walls by addition of a member for inward deflection of the column of hot air rising from the toasting chamber.

2. Description of the Prior Art

The hazards of working with hot appliances are well known and while surface temperatures can be measured with a fair degree of accuracy, the response of individuals when contacting surfaces at various temperatures is a highly subjective one. Nonetheless, on the basis of appropriate studies, practical guides—e.g., Underwriters Laboratory Bulletin #1005 for electric irons—have been developed presenting standards for normal (continuous contact and short term (momentary) contact with hot materials of various types. In particular, on the basis of values from the cited bulletin and an ambient air temperature of 77° F. (25° C.), for metallic members the maximum surface temperatures under these conditions are established as 131° F. (55° C.) and 140° F. (60° C.), respectively. Contrastingly, from non-metallic members the same bulletin indicates 167° F. (75° C.) and 185° F. (85° C.) as the maximum temperatures under the same contact conditions.

Because of the above-mentioned factors, there is interest in ways by which the temperatures of appliance surfaces which users may contact can be reduced to values well below these maxima. This is particularly true of appliances such as the common automatic toaster, where one approach—known from U.S. Pat. No. 2,476,142—is to use a double-walled structure with cooling air flowing through the space between the outer and inner walls. This patent shows a toaster having an outer, non-metallic (thermoplastic) cover or "housing" and an inner, metallic reflector shield slightly spaced from the cover to form a cooling space between them. Vents at the bottom and top of the cover permit continuous flow of air through the space. The shield, disposed between the heating elements and the cover, serves to reflect and absorb heat radiated by the elements.

Heat absorbed by the shield is transferred to the air in the cooling space, causing it to move upwardly by free convection and carry this heat away. The cover therefore remains at a temperature low enough to allow touching as well as to bar softening of the thermoplastic cover material. According to this patent, however, bread is fed laterally through the toaster and thus two large openings are provided at opposite ends of the toaster, which openings contribute significantly to lowering the internal temperature. When this teaching of a "double-wall" with an exhaust vent at the top of the cover is applied, however, to toasters having a chamber with a top opening through which bread is lowered for toasting and through which it is raised upon completion of the toasting—there being no lateral openings through which the bread (and the air) can move—we have found that the cover temperatures increase, an obviously undesirable result.

It is also known to vent the toasting chamber directly—e.g., U.S. Pat. No. 2,414,325—which also shows a heating control and a draft controller for making melba toast, the heat and draft both being reduced, causing the bread to be thoroughly dried and its surface browned. Such direct venting of the toasting chamber is also known from U.S. Pat. No. 2,071,234 which shows a toaster with an electrically-heated central core about which bread slices can be disposed in separate toasting "pockets" and having air inlets at the sides of the pockets and outlets in the top of the outer wall. The latter patent includes a duct arrangement for recirculating the convection air currents at high temperatures for contact with the surface of the bread being toasted, the purpose being to achieve greater toasting efficiency. Such recirculation inherently results in higher temperatures for cover portions near the exit of the toasting chamber. Thus, there is a need for improved air cooling of toaster covers.

SUMMARY OF THE INVENTION

The present invention provides in a toaster comprising a base, a housing supported on the base and having sides and an upper surface with an opening defined by the edge of a slot therein, an electrically-heated toasting chamber located below the slot and having an open upper end adjacent the slot, such that hot air from the heated chamber flows upward through the slot, and heat retaining means supported on the base outward of the toasting chamber in spaced relation to the housing so as to define an open-ended channel wherein cooling air flows under the force of free convection when the toasting chamber is heated, the cooling air entering through an inlet adjacent the base and likewise exiting through the slot; the combination therewith of a member for separation of the cooling air flow out of the channel from the hot air flowing out of the toasting chamber, the member being mounted adjacent the edge of the slot and projecting inward of the toaster by an amount sufficient to effect the separation upon exiting of the cooling air, whereby the temperature of the housing is lowered sufficiently to permit a user to touch said sides and upper surface of the housing at least momentarily without harm. More particularly, the invention provides a slot of predetermined area and the member is mounted above the toasting chamber, but located entirely below the slot, the inward projection reducing the open upper end of the toasting chamber to an area less than the predetermined area of the slot.

It is a principal object of the invention, therefore, to provide an improved air-cooled toaster of the double-wall type through addition of a member enhancing the flow of cooling air in the space between the double walls.

It is a further object to provide an improved air-cooled toaster of the double-wall type by making the above-mentioned member a unitary portion of the inner one of the double walls, the unitary portion extending into the upper end of the toasting chamber and reducing the opening thereof.

It is yet another object of the invention to provide an improved air-cooled toaster of the double-wall type by forming the above-mentioned member into a rectangular opening approximating the well-known flow nozzle in cross-section and having its throat smaller than the slot and located adjacent to it in a subordinate relation.

Other objects and features of the invention will become evident from the following description of preferred embodiments and the claims, in conjunction with the drawing.

BRIEF DESCRIPTION OF THE DRAWING

FIG. 1 is a cross-sectional view of a "double-walled", top-fed toaster of the prior art air-cooled type.

FIG. 2 shows a cross-section of a "double-walled" top-fed toaster having a simple form of deflector according to a first embodiment of the invention.

FIG. 5 is a cross-section of a "double-walled" top-fed toaster having a nozzle-type deflector according to the preferred embodiment of the invention.

FIG. 6 shows an embodiment of the invention similar to FIG. 5 except that the extension applied to the top of the inner wall is entirely linear and at right angles to that wall.

DETAILED DESCRIPTION OF THE PREFERRED EMBODIMENTS

Figure 3:
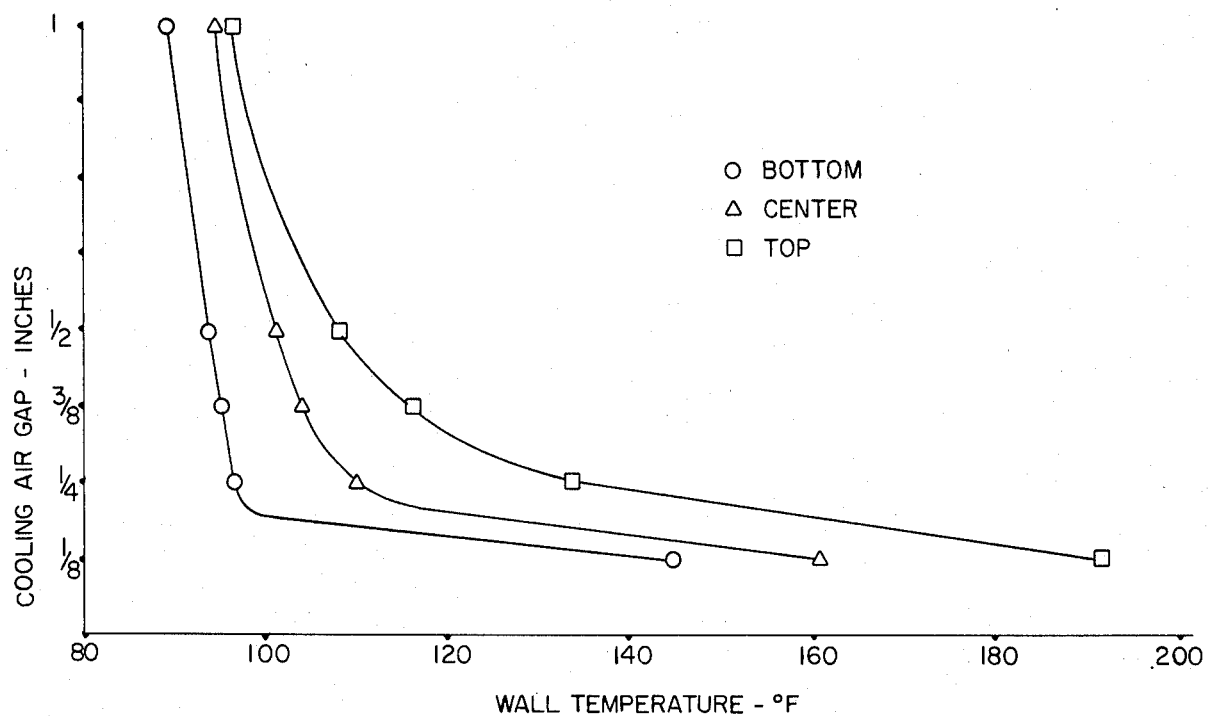
FIG. 3 is a series of curves showing the surface temperature at three points (top, center and bottom) in a simplified "double-wall" structure typical of that applicable to toasters, as a function of spacing between the outer wall and inner wall.

Before beginning with the embodiments according to the invention, a brief description of the toaster having an air-cooled wall according to the prior art will be given, based on FIG. 1. According to that figure, a "double-wall" toaster 10 (only half being shown because of its symmetry) comprises a housing or cover member 11 supported on a base 12, the housing being molded of thermoplastic material (such as a polyester, e.g., Valox manufactured by General Electric Co., Pittsfield, Mass.) and having one (or more) openings 13 adjacent to base 12 to allow circulation of ambient air inside cover 11 in known fashion for purposes of cover temperature control. The cooling air flow is a natural or free convection induced by heating of the air within the interior of cover 11 whenever a piece of bread is inserted into toaster 10 through a slot 21 in the top of cover 11 and an electrical heating element or ribbon 14 is energized by connection to a supply of household current in known fashion. Heating element 14 may be a ribbon wound around a support 15 in the form of an insulating sheet (or with loop ends anchored on an open frame, as is also known). An intervening shield 16 (made of mica, for example, or of polished sheet metal—high reflectivity being consistent with low emissivity, as is known) may be applied for protecting the outer wall (cover 11) from the effects of thermal radiation emitted by heating element 14. More commonly, however, there are two shields, the outermost shield 17 of which forms an "inner wall" for a cooling channel 18. Alternatively, as described subsequently with respect to FIG. 2, shield 16 can be covered with a layer of insulation 16a, the outer surface 17a of which corresponds to "inner wall" 17. Heating of shield 16 (or 17) is the cause of the natural convection in channel 18 becaust at least part of the heat is ultimately transferred to the air adjacent shield 17 (or surface 17a) and contained between it and housing 11. If the inner wall 17 is a shield, it is preferably made of metal for more efficient transfer of the smaller amount of heat to maintain the needed amount of cooling air flow.

The various members 15, 16, and 17 may be supported by direct attachment to base 12—or indirectly through a suitable transverse framework (not shown, but known) affixed to base 12 at opposite ends of toaster 10 and including longitudinal channels 19 for purposes of positively positioning these members in known fashion. Base 12 and insulating member(s) 15 define a toasting chamber 20. A set of grill wires 22 is also supported on base 12 in common fashion (as by screws and/or known tabs matching slots in the above-mentioned framework), the grill wires 22 helping to confine the individual slices of bread more toward the center of the chamber 20 into which these slices are placed for purpose of toasting. The bread is generally supported on a pan 24 which is manually set to a low position, latched, and then raised by a spring-loaded mechanism upon thermostatic release of the latch (none of this mechanism being shown, but being well known and accordingly not described in greater detail as it is not relevant to the invention).

As evident from FIG. 1, the cover 11 of the prior art type toaster 10 has not been provided with the reentrant portion (dotted lines 26) normally present in top-fed toasters to serve as a guide for insertion of a slice into toasting chamber 20. This omission facilitates air flow through channel 18 as taught by known art for air-cooled toaster walls. Further, toaster 10 includes the usual crumb tray 28 located below pan 24, tray 28 often incorporating vent areas 29 for admitting ambient air into chamber 20, and shown here with such venting, though not too relevant for reasons discussed subsequently.

In seeking an improved structure over this prior art, tests were made on a double-wall toaster having the above-mentioned alternative structure (shown in FIG. 2 in connection with a first embodiment to be described, but reference to FIG. 2 being made now as background). A shield similar to shield 16 of FIG. 1 was located adjacent to a heating element similar to 14, 15 of that same figure. A ¾" (1.9 cm) thick layer 16a of insulation (mineral wool) was adhesively affixed to the shield with the outer surface 17a spaced about ⅜" (1 cm) from cover 11. Initial results were obtained under actual toasting conditions at an ambient air temperature of about 74° F.±5° F. (23° C.±3° C.)—the typical laboratory conditions at the time of the test—surface temperatures being measured at vertically spaced points A-D located roughly at the mid-length of cover 1 and distributed as shown in FIG. 2 (point B being at about midheight). Disappointingly, after a short succession of standardized toasting cycles, (five in number), the maximum temperature attained at point D (edge 30 of cover 11 which defines the boundary of the slot 21 through which the slices of bread are inserted for toasting) was already higher (192° F. or 89° C.) than the values derived from the Underwriters Laboratory Bulletin mentioned earlier. By dint of successive modifications [enlarging the openings at the bottom of cover 11 to provide better access to channel 18, raising the base 12 by ¼ inch (0.6 cm), and beveling the top of the insulation 16a—as indicated by the dotted lines 37 in FIG. 2], the temperature at point D was reduced to about 152° F. (67° C.), efforts at further improvement—such as elevation of base 12 by another ¼ inch; addition of holes 29 (vents) in tray 28; or even complete removal of tray 28—being unavailing, the former approach yielding no lower temperatures and the latter two approaches resulting in temperatures even higher than that which resulted upon first enlarging the access openings to channel 18, and effectively vitiating all progress made with the earlier modifications. Specifically, it was found that—as one would expect—enlarging the passage at the top of air flow channel 18, e.g., by eliminating re-entrant portion 26, resulted in lower wall temperatures. Counter to what one might expect, however, no improvement in cooling performance of channel 18 resulted upon providing vents in the crumb tray 28, higher surface temperatures actually being obtained in the upper region of cover 11. It was theorized, as a result, that since addition of vents 29 to tray 28 resulted in increased surface temperatures for cover 11, the problem must be that upward flow of much hotter air from chamber 20 has an inhibiting effect upon the flow of cooling air through channel 18. Accordingly, the structure was further modified such that the hot air from chamber 20 would be confined to a narrower flow area in the region of the exhaust vent (i.e., slot 21 for entry and removal of the bread) with the goal of entraining the cool air rather than impeding its flow. For this purpose, according to a first embodiment of the invention shown in FIG. 2, at its upper end 33 shield 32 supports an angularly-oriented baffle 34 (or deflector 34 as it will be termed hereinafter), this deflector 34 tending to separate the two steams of air and also reduce the area for flow of the hot air emanating from toasting chamber 20, thus increasing its speed and also diverting it inward, i.e., away from the wedge 30 of slot 21. In actual toasting operation, upon measuring the temperatures of cover 11 at the points A-D with deflector 34 present it was found that all wall temperatures (including point D at the edge 30 defining the outermost limits of slot 21) were reduced by about 10°-13° F. (5.5°-7° C.) more than had been achievable with the best previous improvements. Further, whereas previously the addition of vents 29 in tray 28 or its complete removal substantially always resulted in much higher temperatures (particularly at point D), the addition of such vents now had surprisingly little effect—about 2° F. (1° C.) or less.

It may be noted in passing that on adding deflector 34 to the structure of FIG. 2, no attempt was made to achieve an optimum configuration and yet a surprisingly large improvement had been obtained at a point where improvements achieved by increasing the base height above the counter and by trimming the insulation seemed the best that could be attained, further reduction being elusive.

To optimize the deflector structure, then, further or "delimiting" tests were performed on specific structures similar to the multi-shield arrangement of FIG. 1 (for reasons described subsequently). A first series determined wall temperature as a function of spacing between the outer wall (cover 11) and inner wall (shield 17 or surface 17a), the curved shoulder 31 of cover 11 having been removed to simplify the adjustments in spacing and the tests being run without presence of any toast in chamber 20 because it was found that variation in moisture content of the bread, ambient air temperature, and toasting end-point (color) caused differences of up to ±4.5° F. (2.5° C.) to be encountered, yet the tests were intended to establish the efficacy of improvements which would probably only achieve anticipated further results of about 10° F. (5.6° C.). From these tests (see the curves of FIG. 3) it was determined that a spacing of ¼ inch (0.6 cm) between cover 11 and inner wall 17 seemed to be the best compromise; spacing values greater than that not reducing wall temperatures significantly and values only slightly below that resulting in rapid increase in wall temperatures.

Figure 4A:
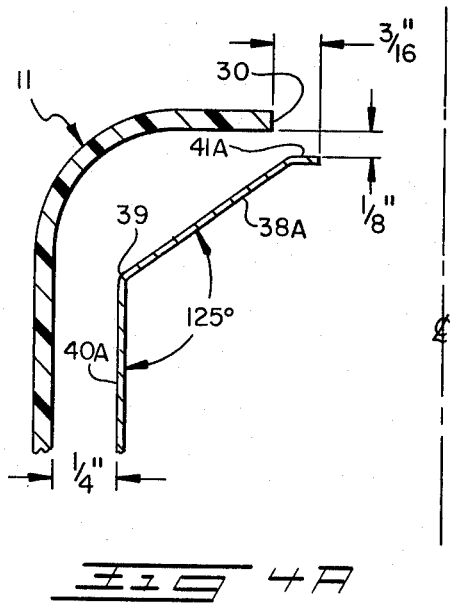
FIGS. 4A to 4D show other forms of deflector similar to that in FIG. 2 and utilized in arriving at the optimum characteristics for the deflector.
Figure 4C:
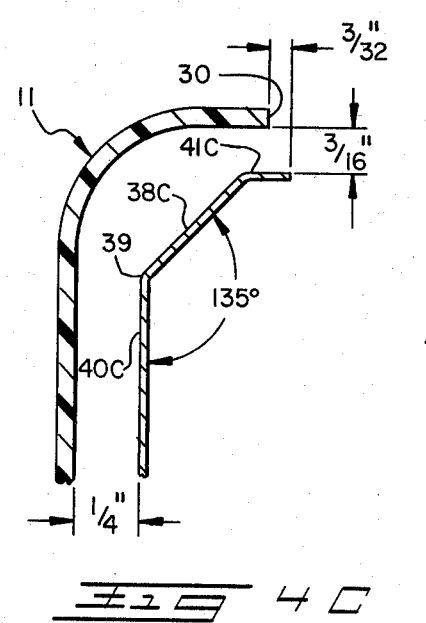
Figure 4B:
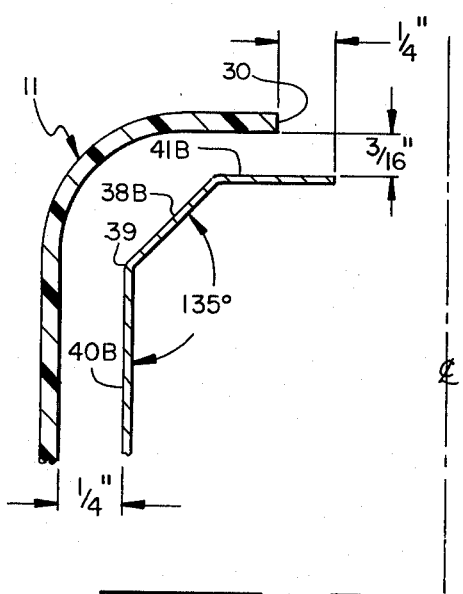
Figure 4D:
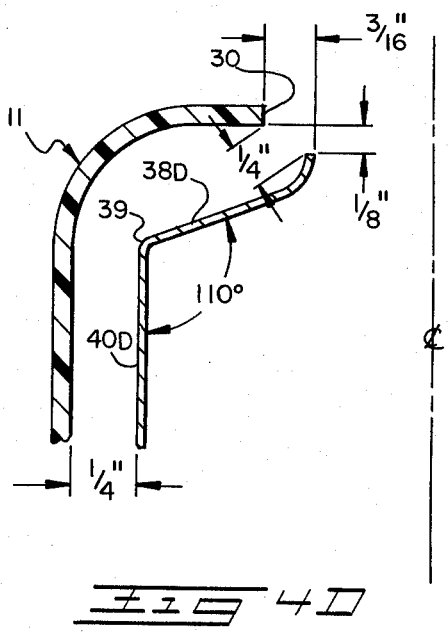

A second test series determined air flow rates attainable with deflectors (see FIGS. 4A-4D) of different shapes, angular-orientation and spacing with respect to the boundaries of slot 21, each applied as an extension 38A-D, respectively, to the upper end 39 of a corresponding shield 40 A-D, equivalent to 17 of FIG. 1 because it forms the inner wall of channel 18. This latter series of tests showed air flow rate to be fairly sensitive to variation in these characteristics. For purposes of this second series of tests, the wall gap was set at the above-mentioned compromise value of ¼ inch (0.6 cm) and then the cooling air flow rate into the toaster was measured as a function of time, data again being obtained without presence of bread in the toasting chamber and heating element 14 being continuously energized up to 90 seconds maximum. Air flow was measured with a thermo-anemometer (manufactured by Alnor Instruments Co., of Chicago, Ill.). The test unit on which these data were obtained differed somewhat from that in FIG. 1 in that it had an air inlet in the form of a succession of four oblong slots located on the vertically-oriented side portion of cover 11 near the bottom (see 13a in FIGS. 6, 7) rather than the continuous horizontal slot 13 at the lower end 36 of cover 11, depicted in the arrangements of FIGS. 1 and 5. Only air flow was measured (because of the uncontrolled nature of variables—such as the previously-mentioned moisture content of the bread-encountered during actual toasting tests), no effort being made to correlate air flow data with actual temperatures of cover 11. Those skilled in the art recognize, of course, that air flow rate in itself is a suitable criterion since higher air flow always results in a lower wall temperature, other things being equal. These tests showed that after 90 seconds of energization of heating element 14, the average of the speed of air flow into the four slots 13a measured at about the center of each slot was highest with the configurations of FIGS. 4A and 4D, being 44.5 ft/min (22.6 cm/sec.) for the latter and somewhat less for the former (42 ft/min or 21.3 cm/sec). The averages for the other two configurations were lower (37 ft/min or 18.8 cm/sec) for reasons not definitely established, but believed attributable for the parallelism of the terminal portion 41B, 41C with cover 11 in the region of slot edge 30, which tends to cause orthogonality (and thus some interference) between the paths of the cooling air exiting from channel 18 and the upward flow of hot air from toasting chamber 20.

While the difference in the air flow rates does not seem particularly appreciable, those skilled in the art will recognize that this difference may still be quite significant in terms of lower surface temperatures, as will now be demonstrated on the basis of a further embodiment of the invention, termed hereinafter the "preferred configuration".

Figure 7:
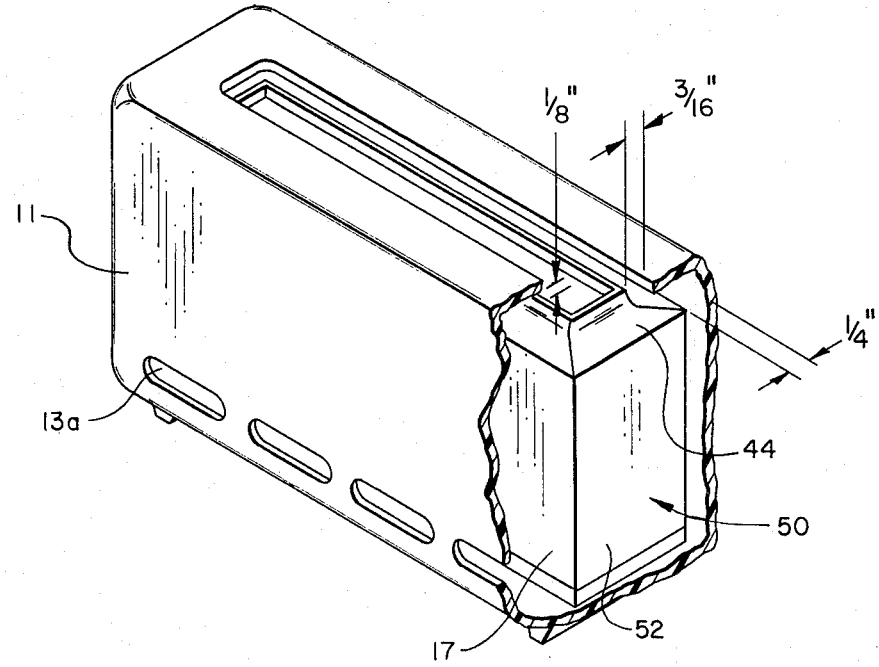
FIG. 7 is a perspective view of a toaster with a double-wall structure incorporating the preferred configuration of the deflector (FIG. 5), the toaster cover being cut away to reveal the rectangular nature of the nozzle-type deflector circumscribing the opening of the toasting chamber.

Pursuant to design guide-lines established by study of the above-mentioned "delimiting" tests, the embodiment shown in FIG. 5 was constructed. As seen in that figure, the combination of a shield and fiber insulation (32, 16a in FIG. 2) was dropped because of unnecessary bulk and because of increased air flow obtained with the structure of FIG. 4D. Also, support 15 for ribbon 14 was of the open frame variety, but this is merely an equivalent and not relevant to the invention. The insulation was replaced by polished metal shield 42 having an initially linear extension 44 at its upper end 45, which extension is angularly—oriented (about 110°–135°, based on the results with the deflectors of FIG. 4 A–D), so as to roughly parallel the contour of shoulder 31 of cover 11 and terminates in an arcuate portion 46 with its tip 48 about 1/8 inch (0.3 cm) below the level of edge 30 of slot 21 in cover 11 and spaced from edge 30 by a distance equal to the width of channel 18—i.e., 1/4 inch (0.6 cm). The arrangement in FIG. 5 will be recognized as equivalent to the shape well-known in fluid dynamics as a "flow nozzle". As seen in FIG. 7, the shape shown in cross-section in FIG. 5 actually extends around the entire periphery of toasting chamber 20, the junctions at the corner being appropriately rounded, the nozzle accordingly being more nearly a rectangle than a circle when viewed along the axis of flow (centerline ℄ in FIG. 5) from chamber 20.

Table I shows the progressive change in surface temperature at two points (edge 30 of slot 21 and shoulder 31 of cover 11) as a function of the number of actual toasting cycles in a toaster with the double-wall structure of FIG. 5.

TABLE I

| ARRANGEMENT | NO. OF CYCLES | WALL TEMPERATURE | | | |
|---|---|---|---|---|---|
| | | SLOT EDGE (D) | | SHOULDER (C) | |
| | | °F. | °C. | °F. | °C. |
| No Deflector (FIG. 1) | 2 | 156 | (69) | 139 | (59) |
| "Square" Deflector (FIG. 6) | 2 | 116 | (47) | 103 | (39) |
| | 5 | 160 | (71) | 142 | (61) |
| | 9 | 173 | (78) | 155 | (63) |
| Nozzle-type Deflector (FIG. 5) | 2 | 107 | (42) | 93 | (34) |
| | 5 | 142 | (61) | 123 | (51) |
| | 9 | 154 | (68) | 139 | (59) |

The superiority of the "preferred configuration" is clearly seen, wall temperature at point D (next to the slot edge 30), being only 154° F. (68° C.) after nine actual toasting cycles or about 19° F. (11° C.) lower than that obtained with a "square" ended shield (see FIG. 6) after the same number of cycles. This value is also about 45° F. (25° C.) lower than the (previously mentioned) value obtained after five toasting cycles with the original structure (FIG. 2 before addition of deflector 34 according to the invention). Further, the "prior art" multiple shield structure of FIG. 1 having no deflector produced temperatures at point D which were 49° F. (27° C.) higher after just two cycles than the 107° F. (42° C.) obtained under the same conditions with the "nozzle-type" structure of FIG. 5. As Table I shows, tests without a deflector were not extended to further toasting cycles because wall temperatures were increasing at a rate such that the softening temperature of the wall material (thermoplastic) would have been attained or even greatly exceeded.

FIG. 7 shows a cut-away view of a double-wall toaster with a deflector of the "preferred configuration", the toaster having a plastic cover 11 and an inner shell or chassis 50 with side walls 17 and end walls 52 serving as shields, each of the walls 17, 52 having a deflector of the type 44 (or 38D) shown in FIG. 5 (or FIG. 4D) at its upper end. The inward projection of deflector 44 beyond the edge 30 of slot 21 is more clearly visible in this view. In this figure, the cooling air inlet in cover 11 is of the "multi-slot" variety 13a shown in FIG. 6 (cross-sectional view) but only as a matter of aesthetic preference, not one of technical superiority, the single horizontal slot 13 being believed equally suitable.

The foregoing has described an air-cooled toaster comprising a toasting chamber 21 separated from a thermoplastic cover 11 by a channel 18 formed by an inner wall (17, 42) and through which cooling air flows by free convection when a heating element 14 is energized, bread slices to be toasted being admitted into toasting chamber 20 through a slot 21 in cover 11; and the inner wall, or shield (17,40,42) bears at its upper end (39, 45) an extension (38A–D, 44) projecting inward to separate the cooling air from the hot air rising out of toasting chamber 20. The extension (38A–D, 44) restricts opening 23 at the upper end of chamber 20 to an area substantially less than that of slot 21, the extension (44) preferably terminating in an arcuate portion (46) having its tip (48) located below and substantially at right angles to the plane of slot 21. The tip (48) is also preferably spaced from the edge of slot 21 by about the width of channel 18.

While specific embodiments of the invention have been disclosed, those skilled in the art will envision further modifications and improvement based on this description. In particular, the rectilinear portions of the extension could be replaced, says, with curvilinear segments uniformly spaced from and concentric with the shoulder of the cover. Conversely, the nozzle-type structure of FIGS. 5 and 7, could be replaced with a piece-wise linear approximation, as suggested by FIGS. 4A–4C, where considerations of low volume and low cost tooling might effect savings. Also the "square" termination disclosed in one embodiment is particularly intended to fall within the scope of the first claim.

In short, the invention is not to be limited to the description, but is to be defined solely by the claims and any such modifications and improvements falling within the scope of the claims are intended to be included within the invention.

We claim:

1. In a toaster comprising a base, a housing supported on the base and having sides and an upper surface with an opening defined by the edge of a slot therein, an electrically-heated toasting chamber located below the slot and having an open upper end adjacent the slot such that hot air from the heated chamber flows upward through the slot, and heat retaining means supported on the base outward of the toasting chamber in spaced relation to the housing so as to define an open-ended channel wherein cooling air flows under the force of free convection when the toasting chamber is heated, the cooling air entering the channel through an inlet adjacent the base and likewise exiting through the slot; the combination therewith of a member for separation of the cooling air flow out of said channel from the hot air flowing out of said toasting chamber, said member being mounted adjacent the edge of the slot with a projection inward of the toaster relative to said edge and extending by an amount sufficient to effect said separation upon exiting of the cooling air, whereby the temperature of said housing is lowered sufficiently to permit a user to touch said sides and upper surface of the housing at least momentarily without harm.

2. A toaster as defined in claim 1 wherein said member is located at least partially above said toasting chamber, but entirely below said slot in the housing, said slot having a predetermined area and said inward projection of the member reducing the open upper end of the toasting chamber to an area less than said predetermined area.

3. A toaster as defined in claim 1 wherein said heat retaining means is interposed between the housing and the toasting chamber and said member is a deflector attached to an upper end of said heat retaining means and being at least partly linear.

4. A toaster as defined in claim 3 wherein said deflector is angularly oriented with respect to said heat retaining means.

5. A toaster as defined in claim 1 wherein said heat retaining means is a shield and said member is an integral extension of said shield, said extension being at least partly linear and angularly-oriented with respect to said shield.

6. A toaster as defined in claim 5 wherein said extension is at right angles to said shield.

7. A toaster as defined in claim 5 wherein said extension has an initial linear portion and terminates in an arcuate portion with a tip proximate said edge of the slot and in subordinate relation thereto.

8. A toaster as defined in claim 7, wherein said initial linear portion is at an angle of about 110°–135° with respect to said shield.

9. A toaster as defined in claim 7 wherein the space between said housing and said shield has a predetermined value and the spacing of said tip from said edge of the slot has substantially the same value.

10. A toaster as defined in claims 3, 5 or 7 wherein said heat retaining means completely circumscribes the toasting chamber.

* * * * *